US011041728B2

(12) United States Patent
Green et al.

(10) Patent No.: US 11,041,728 B2
(45) Date of Patent: Jun. 22, 2021

(54) INTRA-ROUTE FEEDBACK SYSTEM

(71) Applicant: Microsoft Technology Licensing, LLC, Redmond, WA (US)

(72) Inventors: Carter Douglas Green, Redmond, WA (US); Scott Andrew Borton, Seattle, WA (US); Anson Hon-Sun Ho, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 15/921,569

(22) Filed: Mar. 14, 2018

(65) Prior Publication Data

US 2019/0285420 A1  Sep. 19, 2019

(51) Int. Cl.
*G01C 21/32* (2006.01)
*G01C 21/36* (2006.01)
*G06F 16/29* (2019.01)

(52) U.S. Cl.
CPC ............ *G01C 21/32* (2013.01); *G01C 21/36* (2013.01); *G06F 16/29* (2019.01)

(58) Field of Classification Search
CPC ......... G01C 21/32; G01C 21/36; G06F 16/29; B60W 2050/78; B60W 2050/77; B60W 2050/83; B60W 2050/85; B60W 2050/89; B60W 2050/09; B60W 2556/50; B60W 2556/45; G08G 1/96805; G08G 1/968; G08G 1/96811; G08G 1/96816

(Continued)

(56) References Cited

U.S. PATENT DOCUMENTS 6,253,151 B1  6/2001 Ohler et al.
6,885,937 B1  4/2005 Suranyi
(Continued)

FOREIGN PATENT DOCUMENTS

EP  1530025 A2  5/2005

OTHER PUBLICATIONS

"International Search Report and Written Opinion Issued in PCT Application No. PCT/US2019/021058", dated May 23, 2019, 10 Pages.

(Continued)

*Primary Examiner* — Nicholas K Wiltey
*Assistant Examiner* — Terry C Buse
(74) *Attorney, Agent, or Firm* — Alleman Hall Creasman & Tuttle LLP

(57) ABSTRACT

A server system is provided that includes one or more processors configured to receive an intra-route navigation error package including a plurality of route context data from a user computer device. The intra-route navigation error package indicates that a navigation error occurred at a geospatial location. The one or more processors are further configured to send, to the user computing device, a detailed feedback package configured to cause the user computer device to display a feedback interface at a later point in time when a user of the user computer device is not traveling. The detailed feedback package includes a route context determined based on the plurality of route context data and configured to be presented to the user via the feedback interface. The one or more processors are further configured to determine a map correction for a map database based on user input of detailed feedback.

20 Claims, 7 Drawing Sheets

(58) Field of Classification Search
USPC .......................................................... 701/451
See application file for complete search history.

(56) References Cited

U.S. PATENT DOCUMENTS

| | | | |
|---|---|---|---|
| 8,635,017 B2* | 1/2014 | Geelen | G01C 21/32 |
| | | | 701/411 |
| 2005/0102098 A1 | 5/2005 | Montealegre et al. | |
| 2006/0178822 A1 | 8/2006 | Lee | |
| 2007/0156330 A1 | 7/2007 | Goldberg et al. | |
| 2009/0070028 A1* | 3/2009 | Hempel | G01C 21/26 |
| | | | 701/532 |
| 2010/0125409 A1 | 5/2010 | Prehofer | |
| 2010/0211304 A1 | 8/2010 | Hwang et al. | |
| 2010/0332119 A1* | 12/2010 | Geelen | G01C 21/32 |
| | | | 701/533 |
| 2012/0221243 A1 | 8/2012 | Basson et al. | |
| 2013/0326407 A1* | 12/2013 | van Os | G06F 3/04883 |
| | | | 715/810 |
| 2014/0229101 A1 | 8/2014 | Glaser et al. | |
| 2015/0032366 A1 | 1/2015 | Man et al. | |
| 2015/0032424 A1 | 1/2015 | Gupta et al. | |
| 2015/0309717 A1* | 10/2015 | Sinaguinan | B60W 40/08 |
| | | | 701/538 |
| 2015/0338234 A1* | 11/2015 | Seastrom | G01C 21/3679 |
| | | | 701/409 |
| 2016/0155310 A1* | 6/2016 | Joao | H04W 4/90 |
| | | | 340/573.1 |
| 2017/0314944 A1 | 11/2017 | Konig et al. | |
| 2018/0038710 A1* | 2/2018 | Shang | G01C 21/367 |
| 2018/0051997 A1 | 2/2018 | Grochocki et al. | |
| 2018/0094943 A1 | 4/2018 | Grochocki et al. | |
| 2019/0178671 A1* | 6/2019 | DeLuca | G01C 21/3641 |

OTHER PUBLICATIONS

"Non Final office action issued in U.S. Appl. No. 15/243,631", dated Jan. 30, 2018, pp. 16.

Ceikute, et al., "Routing Service Quality—Local Driver Behavior Versus Routing Services", In Proceedings of IEEE 14th International Conference on Mobile Data Management, vol. 1, Jun. 3, 2013, 10 Pages.

Delling, et al., "Navigation Made Personal: Inferring Driving Preferences from GPS Traces", In Proceedings of the 23rd SIGSPATIAL International Conference on Advances in Geographic Information Systems, Nov. 3, 2015, 9 Pages.

Sieber, Tina, "Create Google Maps of Your Own to Share & Collaborate With Friends", Retrieved from «https://www.makeuseof.com/tag/create-google-maps-of-your-own-to-share-collaborate-with-friends/», Feb. 12, 2013, 4 Pages.

Volkel, Thorsten, "Personalized and Adaptive Navigation Based on Multimodal Annotation", In Proceedings of ACM SIGACCESS Accessibility and Computing, Issue 86, Sep. 2006, 4 Pages.

"Non Final office action issued in U.S. Appl. No. 15/243,631", dated Jan. 30, 2018, p. 16.

* cited by examiner

INTRA-ROUTE FEEDBACK SYSTEM

BACKGROUND

Routing systems generate routes from a starting location to an ending location based on stored map data. However, in certain cases, the map data may not accurately match the real-world environment encountered by a user. This mismatch may occur due to errors in the originally inputted map data, or due to subsequent changes in the environment, such as changes to roads, signs, businesses, etc. As a result, the routes recommended by the routing systems may potentially include erroneous directions.

SUMMARY

A server system is provided that may include one or more processors configured to receive an intra-route navigation error package including a plurality of route context data from a user computer device. The intra-route navigation error package indicates that a navigation error occurred at a geospatial location. The one or more processors may be further configured to send, to the user computing device, a detailed feedback package configured to cause the user computer device to display a feedback interface at a later point in time when a user of the user computer device is not traveling. The detailed feedback package may include a route context determined based on the plurality of route context data and configured to be presented to the user via the feedback interface. The one or more processors may be further configured to receive, from the user computing device, a user input of detailed feedback entered via the feedback interface, and determine a map correction for a map database based on the user input of detailed feedback.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Typical routing applications generate one or more recommended routes between a starting location and an ending location that are presented to a user. The user may select one of the recommended routes, and is provided with step-by-step directions for traveling along the selected route. These routes are typically generated based on stored map data, which, for example, may include data for known roads and buildings. However, navigation errors in the recommended routes may occur if the routing logic is flawed and/or when the stored map data itself has incorrect data. These navigation errors may be difficult and expensive to detect/debug without input from the users of those routing applications.

Current routing applications allow users to provide simple and constrained feedback to indicate a general like or dislike of a selected route. For example, a typical routing application may provide an interface for a user to "thumbs-up" or "thumbs-down" a route that the user selected and is currently traveling upon. While this simple and constrained feedback is useful for determining that a particular selected route may have a navigation error, these feedback systems do not provide specific and detailed feedback that describe what the navigation error actually entailed. For example, if a user traveling along a selected route notices that the provided directions from the routing application mislabeled a particular exit, typical routing applications do not provide an interface for users to explain that the exit was mislabeled and/or how it can be corrected.

Attempting to elicit detailed feedback from the user while the user is currently traveling along a route may not be possible because the user is concentrating on driving the vehicle. For example, while the user is driving their vehicle, it may be distracting to the user to enter detailed feedback when they encounter a navigation error, such as an incorrect direction. In scenarios where the user is walking or jogging along a selected route, attempting to elicit detailed feedback from the user may potentially be distracting and inconvenient for the user.

Figure 1:
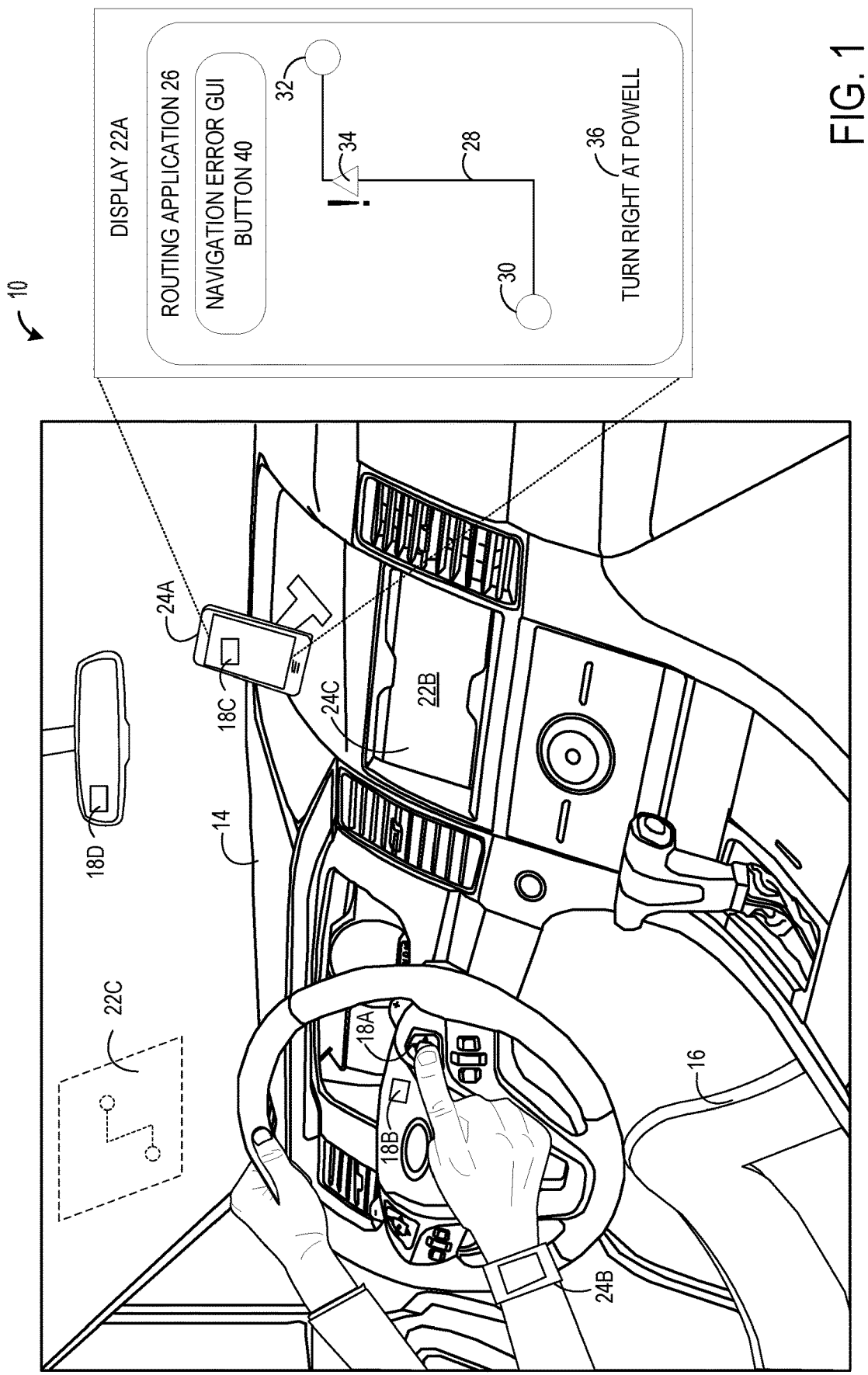
FIG. 1 shows an example computer system for capturing route context data in response to an intra-route user input.

To address these issues, a computer system 10 and server system 12 are provided. FIG. 1 illustrates a computer system 10 for providing detailed feedback regarding an intra-route navigation error. In the illustrated example, the computer system 10 takes the form of multiple devices located within a vehicle 14 being driven by the user 16. However, it will be appreciated that the computer system 10 is not limited to examples devices within the vehicle 14. For example, the computer system 10 may take the form of a wrist-mounted and/or head-mounted computing device being worn by a user that is walking, jogging, or biking along a route. As another example, the computer system 10 may take the form of devices integrated into the body of a bike that the user is riding.

In the example illustrated in FIG. 1, the computer system 10 includes an input device 18, a plurality of sensor devices 20, a display 22, and a user computing device 24. The user computing device 24 may include a processor, a non-volatile storage device, a volatile storage device, and other suitable computing components. In one example, the input device 18, the plurality of sensor devices 20, and the display 22 may be included in the user computer device 24. In another example, one or more of the input device 18, the plurality of sensor device 20, the display 22, and the user computer device 24 may be separate devices that are distributed within or on the vehicle 14 and/or worn by the user 16.

In one example, the user computer device 24 may take the form of a mobile computer device 24A which, for example, may be mounted via a stand on a dashboard of the vehicle 14. As another example, the user computer device 24 may take the form of a wrist-mounted computer device 24B worn by the user 16. As yet another example, the user computer device 24 may take the form of an on-board computer device 24C integrated within the vehicle 14. However, it will be appreciated that the user computing device 24 is not limited to the examples described above, and may take other suitable forms such as, for example, a head-mounted display device that may be worn by the user. In some examples, the user computer device 24 may include multiple computer devices that may act in concert to perform the functions described herein. For example, a wrist-mounted computer device 24B may be configured to communicate with a mobile computer device 24A, which may in turn be configured to communicate with an on-board computer device 24C.

The user computer device 24, such as the mobile computing device 24A, may be configured to execute a routing application 26 that provides recommended routes 28 from a starting location 30 to an ending location 32. In one example, the routing application 26 may generate a plurality of recommended routes 28 from the starting location 30 to the ending location 32. The plurality of recommended routes may be generated based on map data stored on the user computer device 24 and/or map data stored on a database of a server device configured to communicate with the routing application 26. A user may select one of the plurality of recommended routes 28, and the routing application 26 may provide step-by-step directions for the user to travel along the user selected route. In one example, the routing application 26 may be further configured to track an actual route traveled by the user via a global positioning system (GPS) of the user computing device 24.

The recommended route 28 may be displayed to the user via a display 22A of the user computer device 24A mounted to a stand on the dashboard of the vehicle 14. However, it will be appreciated that the display 22 may be integrated into other computer devices within the vehicle 14. For example, the display 22 may take the form of an on-board display 22B that is integrated into the on-board computer device 24C of the vehicle 14. As another example, the display 22 may take the form of a heads-up display 22C that is projected onto the windshield of the vehicle 14. As yet another example, the display 22 may take the form of a see-through display of a head-mounted display device.

While the user is traveling along the recommended route 28, the user may potentially encounter a navigation error at a particular geospatial location along the recommended route 28, which is denoted by the exclamation icon 34 in the example illustrated in FIG. 1. As a specific example, the step-by-step instructions 36 provided by the routing application 26 indicate that the user should turn right at "Powell" street. However, as the user reached that street to turn as indicated by the recommended route 28, the user noticed that the actual name of the street was "Broadway". Upon noticing this error in the navigation directions, the user may enter an intra-route user input 38 to an input device 18 to indicate that the user encountered an issue with the routing directions of the routing application 26. In the illustrated example, the intra-route user input 38 is entered via the user pressing a physical button input device 18A integrated into a driving wheel of the vehicle 14.

The computer system 10 is configured to detect the intra-route user input 38 via the input device 18 indicating that a navigation error has occurred. The intra-route user input 38 may be entered via a variety of input methods depending on the type of input device 18. In the example illustrated in FIG. 1, the intra-route user input 38 is entered via depressing or otherwise actuating a physical button input device 18A on the wheel. In one example, the computer system 10 may include a microphone input device 18B that is integrated in the wheel and/or another location on the vehicle 14, or is included in the user computer device 24, such as, for example, the mobile computer device 24A. Thus, the user may enter the intra-route user input 38 via speech, which is detected by the microphone input device 18B. For example, the intra-route user input 38 may be set to be triggered when the user says, "There's an error in the directions". However, it will be appreciated that any suitable phrase and word may be set as a trigger by user settings to trigger the intra-route user input 38.

As another example, the display 22 may include a capacitive touch screen input device 18C that is integrated into the display 22A of the mobile computer device 24A or the on-board display 22B of the on-board computer device 24C. In the illustrated example, the routing application 26 shown on the display 22A of the mobile computer device 24A includes a navigation error graphical user interface (GUI) button 40. Thus, the user may touch the touch screen input device 18C at the location of the navigation error GUI button 40 shown on the display 22A to enter the intra-route user input 38.

As yet another example, an inward facing camera input device 18D may be included in the vehicle 14 or integrated into a head-mounted display device worn by the user. In this example, the inward facing camera input device 18D may be configured to detect a gaze or gesture input of the user. To enter the intra-route user input 38, the user may make a predetermined gesture with their hands or manipulate their gaze in a predetermined manner that is set to trigger the intra-route user input 38.

It will be appreciated that the input methods for the intra-route user input 38 are not limited to the examples described above. Any other suitable type of input device and corresponding input method may be utilized to enter the intra-route user input 38.

Figure 2:
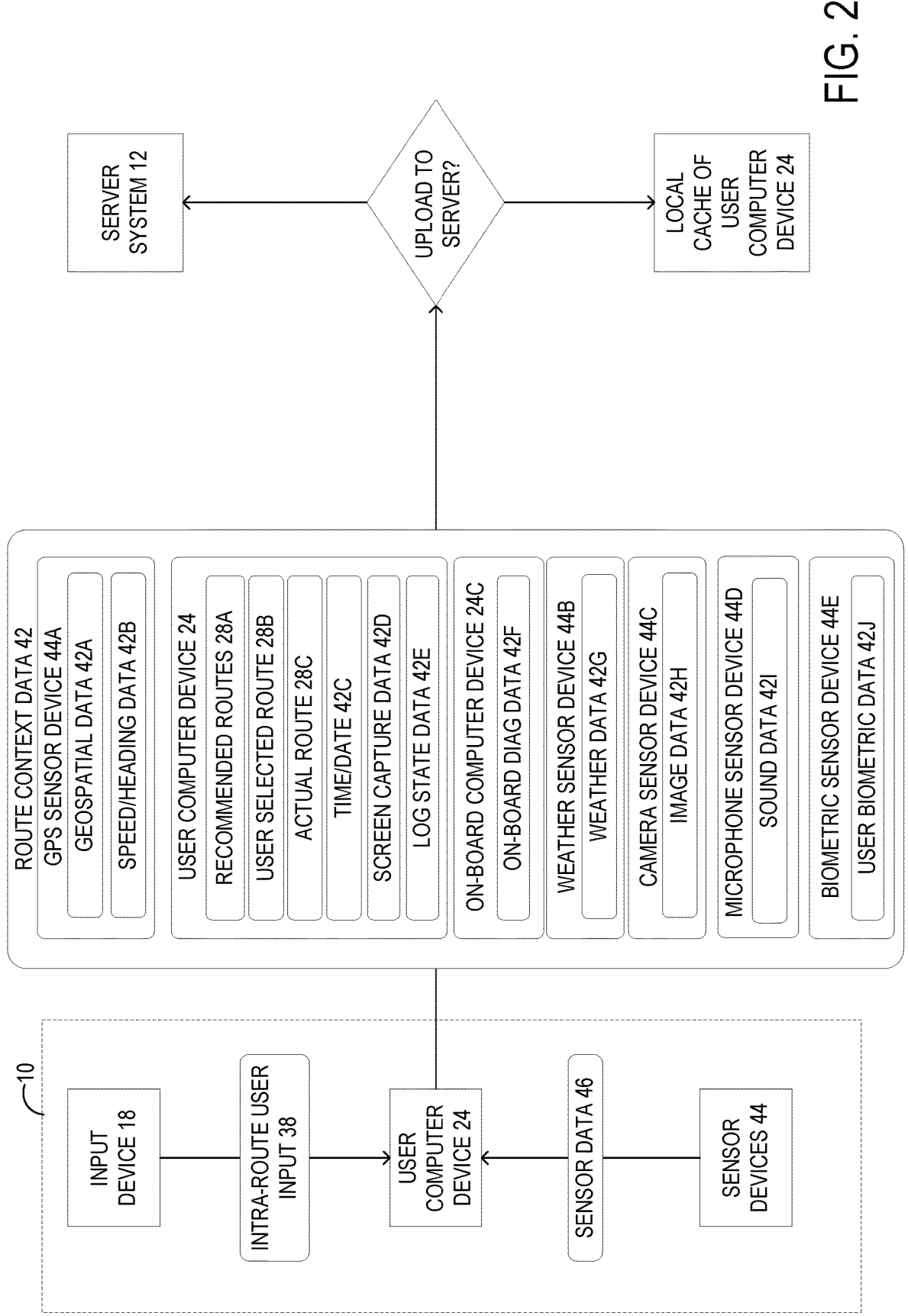
FIG. 2 shows a schematic view of the computer system of FIG. 1.

FIG. 2 illustrates a schematic view of the computer system 10 that may, for example, includes various devices that are distributed around the vehicle 14 of the user 16 and worn by the user 16 while operating the vehicle 14. Although a motorized vehicle is depicted, it will be appreciated that the computer system 10 may be implemented using a human-powered vehicle such as a bicycle. In response to detecting the intra-route user input 38 via the input device 18 of the computer system 10, the user computer device 24 of the computer system 10 is configured to determine a current geospatial location of the computer system 10 and capture a plurality of route context data 42 via a plurality of sensor devices 44 and other devices and of the computer system 10. As shown, the user computer device 24 may receive the route context data 42 as various sensor data 46 received from the plurality of sensor devices 44. In particular, the current geospatial location of the computer system 10 may be detected via a GPS sensor device 44A configured to detect geospatial data 42A and speed and heading data 42B. The GPS sensor device 44A may be included in one or more devices of the computer system 10. For example, the user computer device 24 itself may include the GPS sensor device 44A. As another example, the on-board computer device 24C of the vehicle 14 may include the GPS sensor device 44A. However, it will be appreciated that other devices of the computer system 10 may also include the GPS sensor device 44A.

As illustrated in FIG. 2, the plurality of route context data 42 may include a variety of different types of sensor data 46 that is gathered from different types of sensor devices 44 and computing devices of the computer system 10. In the illustrated example, the plurality of sensor devices 44 includes a weather sensor device 44B, a camera sensor device 44C, a microphone sensor device 44D, and a biometric sensor device 44E. Route context data 42 may also be gathered from the user computer device 24 and the on-board computer device 24C. Additionally, it will be appreciated that some of the sensor devices 44 may also be utilized as input devices 18. For example, the microphone sensor device 44D may take the form of the microphone input device 18B shown in FIG. 1 that may be integrated into the vehicle 14 or included within the user computer device 24.

In one example, the user computer device 24 is configured to execute the routing application 26 which generates recommended routes 28. These recommended routes 28 generated by the routing application 26 may be stored as recommended routes 28A in the plurality of route context data 42. Similarly, the particular route selected by the user from among the plurality of recommended routes 28 may be stored as user selected route 28B in the plurality of route context data 42. As discussed previously, the route the user actually travels when following the user selected route 28B may also be tracked via the GPS sensor devices 44A and stored at the actual route 28C in the plurality of route context data 42.

As illustrated in FIG. 2, other types of data from the routing application 26 executed on the user computer device 24 may also be captured and stored in the plurality of route context data 42. For example, a time and date 42C when the user entered the intra-route user input 38 may be captured by the user computer device 24 and stored as part of the plurality of route context data 42. As another example, screen capture data 42D for the pixel state of the display 22 of the user computer device 24 at the time that the user entered the intra-route user input 38 may also be captured by the user computer device 24 as part of the route context data 42. The screen capture data 42D may capture what the routing application 26 was displaying to the user at the time that the user encountered the navigation error and entered the intra-route user input 38. Additionally or alternatively to the screen capture data 42D, the user computer device 24 may also capture and store log state data 42E for the routing application 26 which captures a software state of the routing application 26 at the time that the user entered the intra-route user input 38. Rather than capturing all of the pixel data displayed on the display 22, the log state data 42E may instead capture an application state of the routing application 26 that may be used to reconstruct what the routing application 26 presented to the user at the time that user entered the intra-route user input 38.

In another example, the routing application 26 may instead be executed on an on-board computer device 24C of the vehicle 14. In this example, the recommended routes 28A, user selected route 28B, actual route 28C, time and date 42C, screen capture data 42D, and log state data 42E may be captured by the on-board computer device 24C. As illustrated in FIG. 2, the onboard capture device 24C may also capture on-board diagnostics data 42F for the vehicle 14 being driven by the user 16. The on-board diagnostics data 42F may include various diagnostics data that is captured by sensors integrated into the vehicle 14. For example, the on-board diagnostics data 42F may include more precise speed and heading data 42B than what could be captured by the GPS sensor device 44A. As another example, the on-board diagnostics data 42F may include data regarding impact data for the vehicle's shock absorbers which may be useful in scenarios where the navigation error encountered by the user is a pothole in the road. It will be appreciated that other types of data typically captured by on-board diagnostics devices of vehicles may be included in the on-board diagnostics data 42F as part of the route context data 42.

As another example of route context data 42, the weather sensor device 44B may be configured to detect weather data 42G of the environment around the vehicle 14 when the user entered the intra-route user input 38. In one example, the weather data 42G may indicate a rain, wind, and/or snow condition of the surrounding environment. The weather sensor device 44B may include a temperature sensor, a wind sensor, a humidity sensor, a rain sensor, and/or other types of sensor devices that may directly sense the weather conditions of the proximate environment.

The camera sensor device 44C may include inward and outward facing cameras. For example, the inward facing camera input device 18D may also be utilized as the camera sensor device 44C to capture a gaze direction of the user when the user entered the intra-route user input 38 as image data 42H of the route context data 42. As another example, various outward facing cameras of the vehicle 14 or the user computer device 24 may be used to capture image data 42H of the surrounding environment at the time that the user entered the intra-route user input 38. The image data 42H may include the scene in front of the user, such as a 180-degree view in front of the user. As another example, the image data 42H may include 360-degree view around the vehicle 14 of the user. However, it will be appreciated that any suitable degree of view may be captured by the camera sensor devices 44C and stored as image data 42H of the plurality of route context data 42.

The microphone sensor device 44D may capture sound data 42I inside and/or outside of the vehicle 14 of the user 16. Sound data 42I inside of the vehicle 14 may include speech input from the user 16 accompanying the intra-route input 38. Sound data 42I outside of the vehicle 14 may be captured and analyzed to determine whether there are any recognizable sounds. For example, sirens from an ambulance that may indicate that there is a nearby wreck that is causing the navigation error encountered by the user.

The biometric sensor device 44E may be configured to detect user biometric data 42J of the user 16. For example, the wrist-mounted computer device 24B being worn by the user 16 in FIG. 1 may include a heartbeat sensor and may be configured to track the user's heartrate. An abrupt change in the user's heartrate may indicate that a dangerous or surprising navigation error was encountered by the user. Other types of user biometric data 42J may also be captured by the biometric sensor device 44E. For example, the biometric sensor device 44E may detect a user's galvanic skin response. The user biometric data 42J may be included in the route context data 42 dependent upon user settings entered by the user 16. For example, the user may elect whether or not to include user biometric data 42J in the route context data 42 captured by the user computer device 24.

It will be appreciated that the sensor devices 44 and route context data 42 described above are merely exemplary, and that other types of sensor devices 44 and route context data 42 not described above may also be used and gathered by the computer system 10.

The plurality of route context data 42 captured by the computer system 10 may be packaged and sent to the server system 12 over a network, such as, for example, a 4G network. However, in one example, the plurality of route context data 42 may not be sent to the server system 12. While the user is driving, the user computer device's 24 network connectivity may fluctuate. If the user computer device 24 currently does not have an established network connection with the server system 12, the plurality of route context data may be stored in a local cache of the user computer device 24, such as, for example, a non-volatile storage device of the user computer device 24. Once network connectivity has been restored, the user computer device 24 may proceed to send the plurality of route context data 42 to the server system 12.

As another example, the user may specify settings that indicate that the user does not want the plurality of context data to be sent to the server system 12. For example, the user may have set a data savings setting that limits the amount of data that may be sent via a network. As another example, the user may have set a data privacy setting that limits the type of data that may be sent to the server system 12. These settings may be user settings for the user computer device 24 itself, or application settings for the routing application 26 being executed on the user computer device 24. In these examples, the plurality of route context data 42 may be stored locally and not sent to the server system 12.

Figure 3:
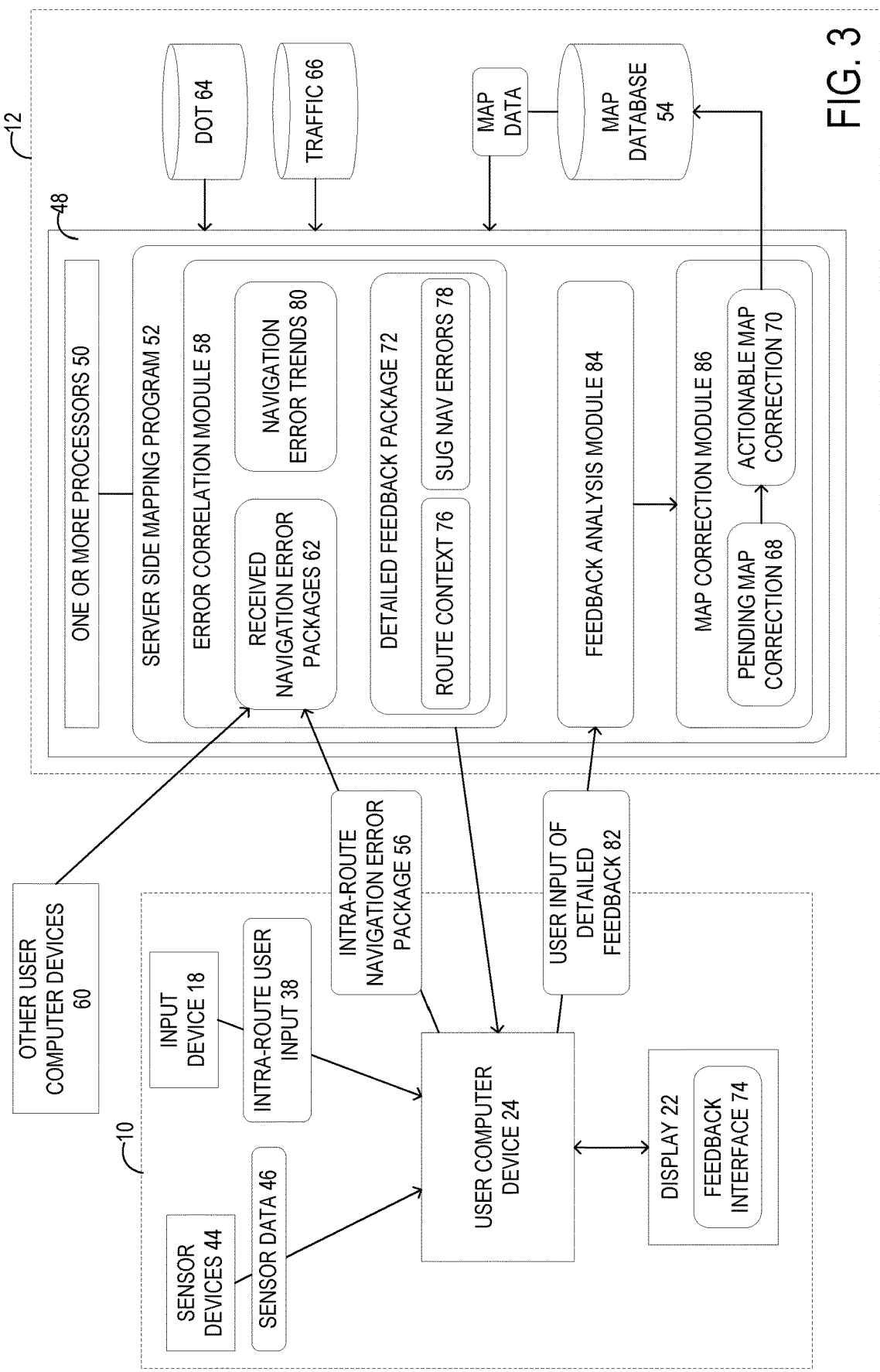
FIG. 3 shows an example server system configured to process user input of detailed feedback from the computer system of FIG. 1 to generate actionable map corrections.

FIG. 3 illustrates a schematic view of the computer system 10 and the server system 12 in an example where the user computer device 24 sends the plurality of context data to the server system 12. The server system 12 may include a server device 48 having one or more processors 50 configured to execute a server side mapping program 52. In one example, the server system 12 may include a plurality of server devices 48 operating in a cloud computing configuration. The server side mapping program 52 is configured to utilize data from a plurality of databases including a map database 54, and communicate with the routing application 26 executed on the user computer device 24 to generate and present recommended routes to the user 16.

As illustrated in FIG. 3, the server side mapping program 52 executed by the one or more processors 50 of the server device 48 are configured to receive an intra-route navigation error package 56 including a plurality of route context data 42 from a user computer device 24, the intra-route navigation error package 56 indicating that a navigation error occurred at a geospatial location. The plurality of route context data 42 may include speed and heading data 42B, route data 28A, 28B, 28C, user biometric data 42J, image data 42H, sound data 42I, and weather data 42G. In one example, the route data includes one or more of the recommended routes 28A, user selected route 28B, and actual route 28C. It will be appreciated that the plurality of route data 42 may include any combination of the example route data 42 illustrated in FIG. 2, as well as other types of route data not specifically described herein. In one example, the geospatial location of the navigation error may be a latitude and longitude detected by the GPS sensor device 44A. In another example, the geospatial location may be a nearest address or cross street to the user computer device 24 when the user 16 entered the intra-route user input 38.

As illustrated, the intra-route navigation error package 56 may be received at an error correlation module 58 of the server side mapping program 52. In addition to the intra-route navigation error package 56 received from the user computer device 24 of the user 16, the server system 12 may also be configured to receive navigation error packages from other user computer devices 60 of other users. All of the navigation error packages 56 received from the user computer devices 24 and the other user computer devices 60 may be collected and stored on the server system 12 as received navigation error packages 62. In one example, the error correlation module 58 may be configured to compare and analyze the received navigation error packages 62 to determines correlations and trends between the plurality of route context data 42 of the received navigation error packages 62.

As a specific example, the error correlation module 58 may determine that multiple users have triggers a navigation error at proximate geospatial locations. Thus, the error correlation module 58 may query various databases with that geospatial location to determine a cause for the navigation error. For example, the error correlation module 58 may query a Department of Transportation database 64, a Traffic Condition database 66, and/or other databases with that geospatial location to determine whether there is construction, road or traffic conditions, or another type of condition that may cause users to trigger a navigation error. From this analysis, the error correlation module 58 may determine pending map corrections 68 and actionable map corrections 70. Pending map corrections 68 are potential map corrections that do not have a high enough confidence level to trigger a correction to the map database 54 managed by the server system 12. Actionable map corrections 70 are potential map corrections that do have a high enough confidence level to trigger a correction to the map database 54.

In another example, the error correlation module 58 may require additional detailed feedback from the user 16 before a pending or actionable map correction 68, 70 can be determined. In this example, the server side mapping program 52 executed by the one or more processor 50 of the server device 48 may be configured to send, to the user computing device 24, a detailed feedback package 72 configured to cause the user computer device 24 to display a feedback interface 74 at a later point in time when a user 16 of the user computer device 24 is not traveling. That is, the detailed feedback package 72 may be received by the user computer device 24 and stored in memory, such as a non-volatile storage device. After receiving the detailed feedback package 72, the user computer device 24 may hold until a later point in time when the user 16 is no longer traveling, such as, for example, when the user computer device 24 detects that the user has not moved locations for a threshold time period. As another example, the user computer device 24 may determine the later point in time based on a detecting that the user 16 has completed the route and has arrived at the ending location 32. As another example, the user computer device 24 may determine the later point in time by setting a timer for an expected point in time when the user will no longer be traveling based on the user selected route 28B. It will be appreciated that the later points in time described above are merely exemplary, and that other suitable points in time may be utilized based on safety and user convenience.

The detailed feedback package 72 includes a route context 76 determined based on the plurality of route context data 42 and configured to be presented to the user 16 via the feedback interface 74. The route context 76 may include one or more of the route context data selected from among the plurality of route context data 42. The route context 76 is presented to the user 16 via the feedback interface 74, and is selected to provide contextual detail to help the user 16 remember the navigation error that they encountered. In one example, the route context 76 presented to the user 16 via the feedback interface 74 includes a map indicating the geospatial location of the user 16 when the intra-route user input 38 was entered. For example, the map may include a drawing of the actual route 28C driven by the user overlaid upon a map of the proximate area. The map may also include an indication of the geospatial location along the route where the user entered the intra-route user input 38.

In another example, the route context 76 presented to the user 16 via the feedback interface 74 includes image data 42H of a surrounding environment at the geospatial location. That is, the route context 76 may include the image data 42H captured by the camera sensor device 44C when the user entered the intra-route user input 38. In some examples, the one or more processors 50 may be configured to crop the image data 42H to reduce the data size of the detailed feedback package 72.

In another example, the route context 76 presented to the user 16 via the feedback interface 74 includes a snapshot of the state of the routing application 26 when the user entered the intra-route user input 38. In particular, the one or more processors 50 of the server system 12 may be configured to reconstruct a state of the routing application 26 based on the screen capture data 42D and/or the log state data 42E, and provide the user with a view of the reconstructed state of the routing application 26 via the feedback interface 74.

It will be appreciated that the route contexts 76 described above are merely exemplary, and that other types of route contexts determined based on the plurality of route context data 42 may be generated and presented to the user 16 of the user computer device 24 via the feedback interface 74 to help the user 16 recall the context of the navigation error that the user 16 encountered, and thus potentially allowing the user to provide more accurate and detailed feedback.

In one example, the error correlation module 58 of the server side mapping program 52 executed by the one or more processors 50 is further configured to determine a suggested navigation error 78 based on the plurality of route context data 42 from the intra-route navigation error package 56. The suggested navigation error 78 may be determined based on navigation error trends 80 determined by the error correlation module 58 by analyzing the received navigation error packages 62 and data gathered from various databases including the Department of Transportation database 64, the Traffic condition database 66, and other suitable databases not specifically mentioned herein. For example, by querying the Department of Transportation database 64 with the geospatial location of the intra-route navigation error package 56 received from the user computer device 24, the error correlation module 58 may, as a specific example, determine that the name of a street was recently changed and updated in the Department of Transportation database 64, and thus determine a suggested navigation error 78 of an incorrect street name navigation error for the user 16 of the user computer device 24.

In one example, the error correlation module 58 is configured to determine one or more other intra-route navigation error packages received from other users indicating that a navigation error occurred proximate to the geospatial location. The error correlation module 58 may analyze the received navigation error packages 62 that were previously received from other user computer devices 60 and identify packages that have geospatial locations corresponding to the geospatial location of the intra-route navigation error package 56 received from the user 16 of the user computer device 24. Based on the identified navigation error packaged 62, the error correlation module 58 may be configured to compare the plurality of route context data 42 from among all of the identified navigation error packages 62 to determine a trend, and determine the suggested navigation error 78 based on route context data 42 of the one or more other intra-route navigation error packages identified by the error correlation module 58. If multiple other users have encountered a particular navigation error, such as incorrect signage, at similar geospatial locations, then the error correlation module 58 may be configured to determine a suggested navigation error 78 of an incorrect signage navigation error for the user 16 of the user computer device 24.

It will be appreciated that the suggested navigation errors 78 and methods of determining those suggested navigation errors 78 described above are merely exemplary, and that other types of suggest navigations errors 78 not specifically mentioned above may also be determined by the error correlation module 58 via other correlation and trend detection methods.

In one example, the error correlation module 58 of the server side mapping program 52 executed by the one or more processors 50 is further configured to determine a plurality of suggested navigation errors 78 based on the plurality of route context data 42. The error correlation module 58 may determine each of the plurality of suggest navigation errors 78 according to the methods described above, and may be further configured to rank the plurality of suggested navigation errors 78 based on a calculated confidence level. Additionally, suggested navigation errors 78 below a threshold confidence level may be prevented from being presented to the user. In one example, the error correlation module 58 may be configured to select a subset of the determined plurality of suggested navigation errors for presentation to the user 16.

In this example, the detailed feedback package 72 sent to the user computer device 24 is configured to cause the user computer device 24 to present a ranked list of the plurality of suggested navigation errors 78 to the user 16 via the feedback interface 74. In one example, the feedback interface 74 may be configured to only present a top three suggested navigation errors 78 having a highest confidence value, and hide the other suggested navigation errors 78 from being viewed by the user. However, it will be appreciated that any suitable number of suggested navigation errors 78 may be presented to the user 16 via the feedback interface 74 shown on the display 22 of the computer system 10.

In one example, after receiving the detailed feedback package 72, the user computer device 24 of the computer system 10 stores the route context 76 and suggested navigation errors 78 in memory, such as, for example, a non-volatile storage device of the user computer device 24. As discussed previously, the feedback interface 74 may not necessarily be immediately displayed upon receiving the detailed feedback package 72. The feedback interface 74 is displayed at the later point in time when the user 16 of the user computer device 24 is no longer traveling. At that point in time, the feedback interface 74 is presented via the display 22 of the computer system 10 and may include a plurality of GUI elements that accept different types of user input, and may further include the route context 76 and one or more suggested navigation errors 78.

The user computer device 24 receives a user input of detailed feedback 82 via the GUI elements of the feedback interface 74. The user input of detailed feedback 82 may then be sent from the user computer device 24 to the server system 12, which is configured to receive the user input of detailed feedback 82 entered via the feedback interface 74 at a feedback analysis module 84. In one example, the user input of detailed feedback may include a text input, a speech input, an annotated map input, and/or an annotated imagery input. The feedback analysis module 84 includes speech-to-text functions, as well as other functions for processing and machine understanding human input. Using these functions, the feedback analysis module 84 extracts structured data from the user input of detailed feedback 82, and sends that structured data to a map correction module 86.

The map correction module 86 of the server side mapping program 52 executed by the one or more processors of the server system 12 receives the processed data from the feedback analysis module 84 from a plurality of user input of detailed feedback 82 received from a plurality of different users. The map correction module 86 is configured to determine trends and correlations in the processed data, and determine pending map corrections 68 and/or actionable map corrections 70 based on those trends and correlations. For example, if multiple users submit detailed feedback 82 that the routing application 26 told them to turn right at "Powell St", when in reality the street was in fact called "Broadway St", then the map correction module 86 may be configured to determine a map correction 68, 70 for a map database 54 based on the user input of detailed feedback 82, such as an actionable map correction 70 to correct map data in the map database 54 to change "Powell St" to "Broadway St". It will be appreciated that the map correction module 86 may also compare the processed detailed feedback from users to accessible data from databases such as, for example, the Department of Transportation database 64, a Traffic Condition database 66, and other databases.

Figure 4:
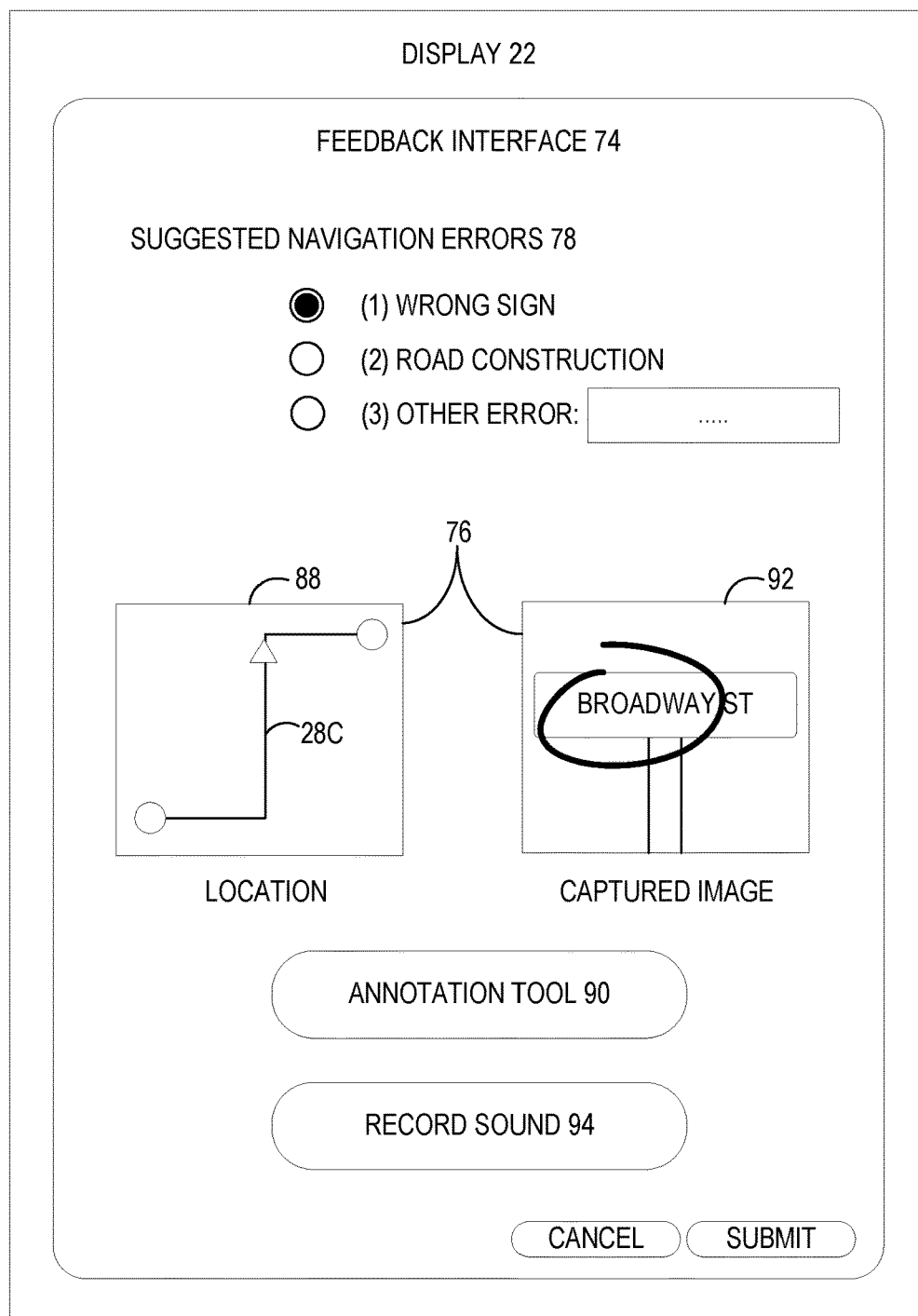
FIG. 4 shows an example feedback interface presented via a display of the example computer system of FIG. 1.

FIG. 4 illustrates an example feedback interface 74 presented via the display 22 of the computer system 10. As discussed above, before displaying the example feedback interface 74, the user computer device 24 of the computer system 10 may be configured to determine a later point in time when a user 16 of the computer system 10 is not traveling. In one example, after receiving the detailed feedback package 72 from the server system 12, the computing system 10 is configured to present, via the display 22 at the later point in time, the feedback interface 74 that includes the route context 76 determined based on the plurality of route context data 42.

However, in another example, if the user has configured a device setting or application setting to not send an intra-route navigation error package 56 to the server system 12, the computer system 10 may be configured to present the feedback interface 74 without receiving a detailed feedback package 72 from the server system 12. In this example, the computer system 12 may be configured to generate the feedback interface 74 itself without input from the server 12. In particular, the computer system 10 may be configured to determine the route context 76 based on the plurality of route context data 42 stored in local memory, such as, non-volatile storage. However, in this example, the feedback interface 74 presented via the display 22 may potentially not include a suggested navigation error 78. After displaying the feedback interface 74 via the display 22, the computer system 10 is configured to receive a user input of detailed feedback 82 via the feedback interface 74, and send the user input of detailed feedback 82 to the server system 12.

As illustrated in FIG. 4, the feedback interface 74 presented via the display 22 may include suggested navigation errors 78. In this specific example, the suggested navigation errors 78 include a "Wrong Sign" suggested navigation error 78 and a "Road Construction" suggested navigation error 78. As shown, when the feedback interface 74 includes a plurality of suggested navigation errors 78, the plurality of suggested navigation errors 78 may be presented as a ranked list. As illustrated, the "Wrong Sign" suggested navigation error had a higher confidence value, and is thus placed higher in the ranked list than the 'Road Construction" suggested navigation error which has a lower confidence value. In this example, the user input of detailed feedback 82 may include a user selection of one of these suggested navigation errors 78. On the other hand, if none of the suggested navigation errors 78 are correct, the user may manually enter a text input to the "Other Error" box. The text input may subsequently be sent the server system 12 as the user input of detailed feedback 82.

In the illustrated example feedback interface 74, the route context 76 is also presented to the user 16 via the display 22. In this specific example, the route context 76 includes a map 88 indicating the geospatial location of the user 16 when the intra-route user input was entered. The map 88 may also include the actual route 28C traveled by the user 16. The map 88 provides route context to help the user 16 remember what navigation error they encountered at that time. Additionally, the feedback interface 74 may further include an annotation tool 90 for the user 16 to annotate the map 88 with detailed feedback. For example, the user may use the annotation tool 90 to circle or otherwise highlight where the navigation error specifically occurred. The annotation to the map 88 may be subsequently sent to the server system 12 as the user input of detailed feedback 82.

As another example, the route context 76 presented via the feedback interface 74 may further include image data 92 of a surrounding environment at the geospatial location. In the illustrated example, the image data 92 is a cropped image of a detected street sign that was generated based on outward facing image data 42H of the plurality of route context data 42 initially captured by the user computer device 24 when the user entered the intra-route navigation input 38. However, it will be appreciated that the image data 92 may comprise uncropped image data, such as the full outward facing image data 42H captured by the user computer device 24. Additionally, the user 16 may enter the user input of detailed feedback 82 by annotating the image data 92 via the annotation tool 90. For example, the user 16 may use the annotation tool 90 to circle or otherwise highlight the "Broadway St" in the imaged street sign to indicate the encounter navigation error.

It will be appreciated that the route contexts 76 illustrated in FIG. 4 and described above are merely exemplary, and that other types of route contexts 76 may also be presented to the user 16 via the feedback interface 74. For example, the feedback interface 74 may include a function to playback a sound recording from sound data 42I recorded when the user entered the intra-route user input 38. Further, data could be presented via the feedback interface 74 such as time and date of the intra-route user input 38, internal images of the passengers, weather information, deviations in the actual route from the user selected route, speed and heading information, etc. These various data may jog the memory of the user, and facilitate the user's feedback to the computer system.

Additionally, it will be appreciated that the methods of entering the user input of detailed feedback 82 described above are merely exemplary, and that other methods of entering user input of detailed feedback 82 may be utilized by the feedback interface 74. For example, the feedback interface 74 may further include a record sound button 94 configured to record a speech input for the user input of detailed feedback 82 in response to the user 16 touching the record sound button 94. The recorded speech input may subsequently be sent to the server system 12 as the user input of detailed feedback 82 and processed by a speech-to-text function of the feedback analysis module 84.

Figure 5:
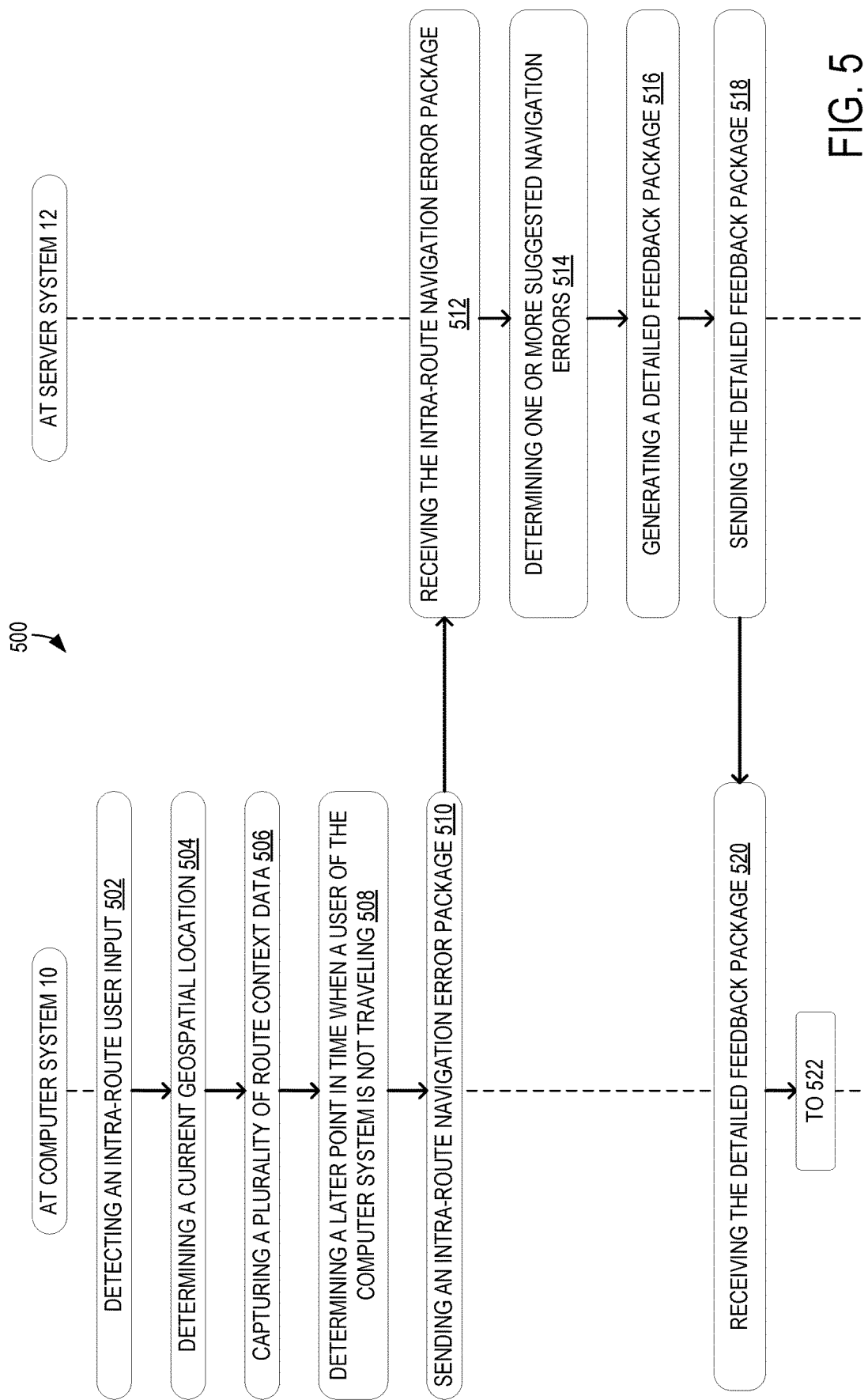
FIG. 5 shows a flowchart illustrating a method for generating actionable map corrections based on user input of detailed feedback implemented by the server system of FIG. 3.

FIG. 5 is a flow chart of a method 500 implemented by a computer system. Method 500 may be executed using the systems described above or utilizing other suitable hardware and software elements.

At 502, the method 500 may include, at a computer system, detecting an intra-route user input via an input device indicating that a navigation error has occurred. In one example the intra-route user input 38 is entered via depressing a physical button input device 18A. In another example, the user may enter the intra-route user input 38 via speech, which is detected by the microphone input device 18B. For example, the intra-route user input 38 may be set to be triggered when the user says, "There's an error in the directions". However, it will be appreciated that any suitable phrase and word may be set as a trigger by user settings to trigger the intra-route user input 38.

At 504, the method 500 may include in response to detecting the intra-route user input, determining a current geospatial location of the computer system 10. The current geospatial location of the computer system 10, and thus the current geospatial location of the user 16, may be determine via the GPS sensor device 44A.

At 506, the method 500 may include capturing a plurality of route context data via the plurality of sensor devices. In one example, the plurality of route context data is selected from the group consisting of speed and heading data, route data, user biometric data, image data, sound data, and weather data. The plurality of route context data 42 may be detected via a plurality of different types of sensor devices. For example, the plurality of sensor devices 44 may include a weather sensor device 44B, a camera sensor device 44C, a microphone sensor device 44D, and a biometric sensor device 44E configured to measure associated route context data.

At 508, the method 500 may include determining a later point in time when a user of the computer system is not traveling. In one example, the later point in time may include a point in time when the user computer device 24 detects that the user has not moved locations for a threshold time period. As another example, the user computer device 24 may determine the later point in time based on a detecting that the user 16 has completed the route and has arrived at the ending location 32. As another example, the user computer device 24 may determine the later point in time by setting a timer for an expected point in time when the user will no longer be traveling based on the user selected route 28B.

At 510, the method 500 may include sending an intra-route navigation error package 510 to a server system 12. In one example, the intra-route navigation error package is generated in response to a user input to the user computer device.

At 512, the method 500 may include, at the server system 12 including one or more processors, receiving the intra-route navigation error package including a plurality of route context data from a user computer device of the computer system 10, the intra-route navigation error package indicating that a navigation error occurred at a geospatial location.

At 514, the method 500 may include determining one or more suggested navigation errors based on the plurality of route context data. In one example, to determine the one or more suggested navigation errors, step 514 may further comprise determining one or more other intra-route navigation error packages received from other users indicating that a navigation error occurred proximate to the geospatial location, and determining the suggested navigation error based on route context data of the one or more other intra-route navigation error packages. In another example, the one or more suggested navigation errors may be determined based on data retrieved from databases, such as a Department of Transportation database and/or a Traffic Condition database, etc.

At 516, the method 500 may include generating a detailed feedback package. In one example, the detailed feedback package may include a route context determined based on the plurality of route context data and configured to be presented to the user via a feedback interface. In another example, the detailed feedback package may further include the one or more suggested navigation errors determined at step 514.

At 518, the method 500 may include sending, to the user computing device, a detailed feedback package configured to cause the user computer device to display a feedback interface at a later point in time when a user of the user computer device is not traveling.

At 520, the method 500 may include, at the computer system 10, receiving the detailed feedback package from the server system 12.

Figure 6:
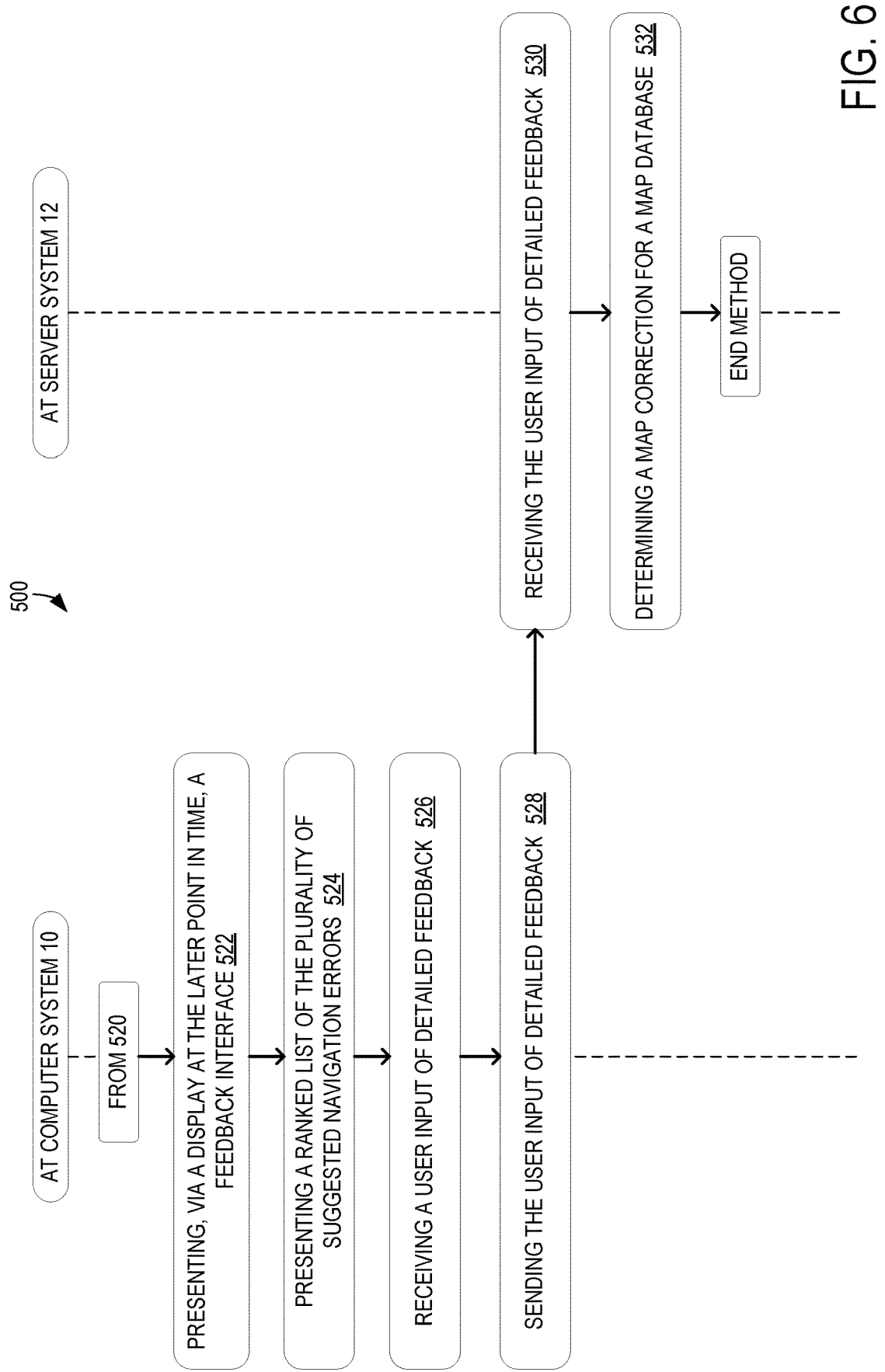
FIG. 6 shows a flowchart that continues the method of FIG. 5.

FIG. 6 is a flow chart that continues the method 500. At 522, the method 500 includes presenting, via the display at the later point in time, a feedback interface that includes a route context determined based on the plurality of route context data. In one example, the route context presented to the user via the feedback interface includes a map indicating the geospatial location of the user when the user input was entered. In this example, the feedback interface may include an annotation tool for the user to annotate the map with detailed feedback. In another example, the route context presented to the user via the feedback interface includes image data of a surrounding environment at the geospatial location. In this example, the user may enter detailed feedback via the annotation tool of the feedback interface.

At 524, the method 500 may include presenting a ranked list of the plurality of suggested navigation errors to the user via the feedback interface. In one example, the user may enter detailed feedback via selecting one of the plurality of suggested navigation errors in the ranked list.

At 526, the method 500 may include receiving a user input of detailed feedback via the feedback interface. In one example, the user input of detailed feedback is selected from the group consisting of a text input, a speech input, an annotated map input, and an annotated imagery input. At 528, the method 500 may include sending the user input of detailed feedback to the server system.

At step 530, the method 500 may include receiving the user input of detailed feedback entered via the feedback interface from the computer system 10. The user input of detailed feedback may be processed and analyzed by a feedback analysis module. In one example, the feedback analysis module may include speech-to-text functions, as well as other functions for processing and machine understanding human input. Using these functions, the feedback analysis module extracts structured data from the user input of detailed feedback.

At step 532, the method 500 may include determining a map correction for a map database based on the user input of detailed feedback. In one example, the server system 10 may be configured to determine trends and correlations in processed data from step 530, and determine pending map corrections 68 and/or actionable map corrections 70 based on those trends and correlations. For example, if multiple users submit detailed feedback 82 that the routing application 26 told them to turn right at "Powell St", when in reality the street was in fact called "Broadway St", then the server system 12 may be configured to determine a map correction 68, 70 for a map database 54 based on the user input of detailed feedback 82, such as an actionable map correction 70 to correct map data in the map database 54 to change "Powell St" to "Broadway St".

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
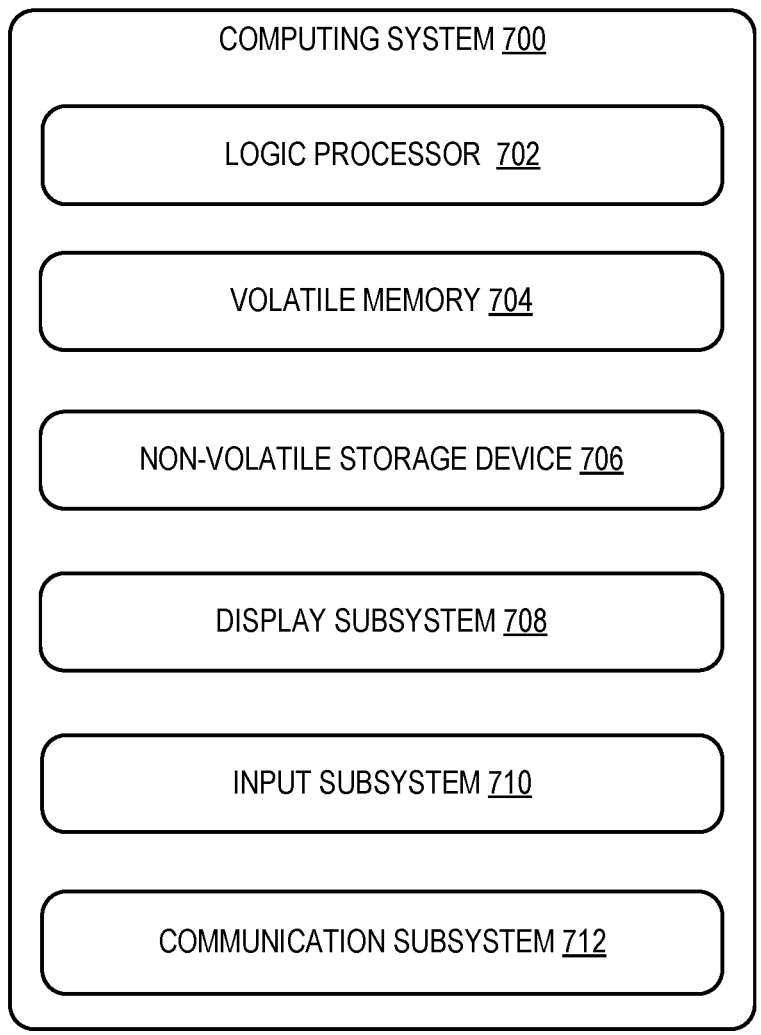
FIG. 7 is a schematic view of an example computing environment in which the computer system of FIG. 1 and server system of FIG. 3 may be enacted.

FIG. 7 schematically shows a non-limiting embodiment of a computing system 700 that can enact one or more of the methods and processes described above. Computing system 700 is shown in simplified form. Computing system 700 may embody the computer system 10 and server system 12 described above, including the user computer device 24, server device 48, and other computer devices illustrated in FIGS. 1 and 3. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 704 may be transformed—e.g., to hold different data.

Non-volatile storage device 706 may include physical devices that are removable and/or built-in. Non-volatile storage device 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition;

an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a server system comprising one or more processors configured to receive an intra-route navigation error package including a plurality of route context data from a user computer device, the intra-route navigation error package indicating that a navigation error occurred at a geospatial location, send, to the user computing device, a detailed feedback package configured to cause the user computer device to display a feedback interface at a later point in time when a user of the user computer device is not traveling, the detailed feedback package including a route context determined based on the plurality of route context data and configured to be presented to the user via the feedback interface, receive, from the user computing device, a user input of detailed feedback entered via the feedback interface, and determine a map correction for a map database based on the user input of detailed feedback. In this aspect, additionally or alternatively, the plurality of route context data may be selected from the group consisting of speed and heading data, route data, user biometric data, image data, sound data, and weather data. In this aspect, additionally or alternatively, the intra-route navigation error package may be generated in response to a user input to the user computer device. In this aspect, additionally or alternatively, the route context presented to the user via the feedback interface may include a map indicating the geospatial location of the user when the user input was entered. In this aspect, additionally or alternatively, the feedback interface may include an annotation tool for the user to annotate the map with detailed feedback. In this aspect, additionally or alternatively, the route context presented to the user via the feedback interface may include image data of a surrounding environment at the geospatial location. In this aspect, additionally or alternatively, the one or more processors may be further configured to determine a suggested navigation error based on the plurality of route context data from the intra-route navigation error package, and present the suggested navigation error to the user via the feedback interface. In this aspect, additionally or alternatively, to determine the suggested navigation error, the one or more processors may be further configured to determine one or more other intra-route navigation error packages received from other users indicating that a navigation error occurred proximate to the geospatial location, and determine the suggested navigation error based on route context data of the one or more other intra-route navigation error packages. In this aspect, additionally or alternatively, the one or more processors may be configured to determine a plurality of suggested navigation errors based on the plurality of route context data, and present a ranked list of the plurality of suggested navigation errors to the user via the feedback interface. In this aspect, additionally or alternatively, the user input of detailed feedback may be selected from the group consisting of a text input, a speech input, an annotated map input, and an annotated imagery input.

Another aspect provides a method comprising, at a server system including one or more processors, receiving an intra-route navigation error package including a plurality of route context data from a user computer device, the intra-route navigation error package indicating that a navigation error occurred at a geospatial location, sending, to the user computing device, a detailed feedback package configured to cause the user computer device to display a feedback interface at a later point in time when a user of the user computer device is not traveling, the detailed feedback package including a route context determined based on the plurality of route context data and configured to be presented to the user via the feedback interface, receiving, from the user computing device, a user input of detailed feedback entered via the feedback interface, and determining a map correction for a map database based on the user input of detailed feedback. In this aspect, additionally or alternatively, the plurality of route context data may be selected from the group consisting of speed and heading data, route data, user biometric data, image data, sound data, and weather data. In this aspect, additionally or alternatively, the intra-route navigation error package may be generated in response to a user input to the user computer device. In this aspect, additionally or alternatively, the route context presented to the user via the feedback interface may include a map indicating the geospatial location of the user when the user input was entered. In this aspect, additionally or alternatively, the feedback interface may include an annotation tool for the user to annotate the map with detailed feedback. In this aspect, additionally or alternatively, the route context presented to the user via the feedback interface may include image data of a surrounding environment at the geospatial location. In this aspect, additionally or alternatively, the method may further comprise, at the server system, determining a suggested navigation error based on the plurality of route context data from the intra-route navigation error package, and presenting the suggested navigation error to the user via the feedback interface. In this aspect, additionally or alternatively, the method may further comprise, at the server system, determining one or more other intra-route navigation error packages received from other users indicating that a navigation error occurred proximate to the geospatial location, and determining the suggested navigation error based on route context data of the one or more other intra-route navigation error packages. In this aspect, additionally or alternatively, the method may further comprise, at the server system, determining a plurality of suggested navigation errors based on the plurality of route context data, and presenting a ranked list of the plurality of suggested navigation errors to the user via the feedback interface.

Another aspect provides a computer system comprising an input device, a plurality of sensor devices, a display, and a processor configured to detect an intra-route user input via the input device indicating that a navigation error has occurred, in response to detecting the intra-route user input, determine a current geospatial location of the computer system and capture a plurality of route context data via the plurality of sensor devices, determine a later point in time when a user of the computer system is not traveling, present, via the display at the later point in time, a feedback interface that includes a route context determined based on the plurality of route context data, receive a user input of detailed feedback via the feedback interface, and send the user input of detailed feedback to a server system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server system comprising:
one or more processors configured to:
receive, from a user computer device at an initial point in time as a user travels along a route, an intra-route navigation error package including a plurality of route context data that includes context data captured by a plurality of sensor devices, the intra-route navigation error package indicating that a navigation error occurred at a geospatial location detected via a positioning sensor device of the plurality of sensor devices, wherein at least a portion of the route context data includes user biometric data, image data, sound data, or weather data captured by at least another sensor device of the plurality of sensor devices;
send, to the user computing device, a feedback package configured to cause the user computer device to display a feedback interface at a later point in time upon completion of travel along the route when the user of the user computer device is not traveling, the feedback package including a route context determined based on the plurality of route context data and configured to be presented to the user via the feedback interface, wherein the feedback package further includes at least the portion of the route context data that includes the user biometric data, the image data, the sound data, or the weather data to be presented to the user via the feedback interface;
receive, from the user computing device, a user input of feedback that identifies a feature of the navigation error entered via the feedback interface; and
determine a map correction for a map database based on the user input of feedback.

2. The server system of claim 1, wherein the intra-route navigation error package is generated in response to a user input to the user computer device.

3. The server system of claim 1, wherein the route context presented to the user via the feedback interface includes a map indicating the geospatial location of the user when the user input was entered, and wherein the feedback interface includes an annotation tool for the user to annotate the map with feedback.

4. The server system of claim 1, wherein the plurality of sensor devices include a camera device configured to capture the image data of a surrounding environment at a time that the navigation error occurred, and wherein the route context presented to the user via the feedback interface includes at least a portion of the image data of the surrounding environment at the geospatial location.

5. The server system of claim 4, wherein the feedback interface includes an annotation tool for annotating on the portion of the image data of the surrounding environment at the geospatial location presented via the feedback interface, wherein the annotation tool generates an annotated imagery input for an annotation based on a user input, the annotated imagery input being associated with the portion of the image data and sent to the server system as the user input of feedback.

6. The server system of claim 1, wherein the one or more processors are further configured to:
determine a suggested navigation error based on the plurality of route context data from the intra-route navigation error package; and
present the suggested navigation error to the user via the feedback interface.

7. The server system of claim 6, wherein to determine the suggested navigation error, the one or more processors are further configured to:
determine one or more other intra-route navigation error packages received from other users indicating that a navigation error occurred proximate to the geospatial location; and
determine the suggested navigation error based on route context data of the one or more other intra-route navigation error packages.

8. The server system of claim 6, wherein the one or more processors are configured to determine a plurality of suggested navigation errors based on the plurality of route context data, and present a ranked list of the plurality of suggested navigation errors to the user via the feedback interface.

9. The server system of claim 1, wherein the plurality of sensor devices includes a microphone sensor device configured to capture the sound data at a time that the navigation error occurred, and wherein the route context presented to the user via the feedback interface includes a playback of at least a portion of the sound data.

10. The server system of claim 1, wherein the plurality of sensor devices includes a weather sensor device that includes at least one of a temperature sensor, a wind sensor, a humidity sensor, and a rain sensor, wherein the weather sensor device is configured to capture the weather data of a nearby environment at a time that the navigation error occurred, and wherein the route context presented to the user via the feedback interface includes at least a portion of the weather data.

11. A method comprising:
at a server system including one or more processors:
receiving, from a user computer device at an initial point in time as a user travels along a route, an intra-route navigation error package including a plurality of route context data that includes context data captured by a plurality of sensor devices, the intra-route navigation error package indicating that a navigation error occurred at a geospatial location detected via a positioning sensor device of the plurality of sensor devices, wherein at least a portion of the route context data includes user biometric data, image data, sound data, or weather data captured by at least another sensor device of the plurality of sensor devices;

sending, to the user computing device, a feedback package configured to cause the user computer device to display a feedback interface at a later point in time upon completion of travel along the route when the user of the user computer device is not traveling, the feedback package including a route context determined based on the plurality of route context data and configured to be presented to the user via the feedback interface, wherein the feedback package further includes at least the portion of the route context data that includes the user biometric data, the image data, the sound data, or the weather data to be presented to the user via the feedback interface;

receiving, from the user computing device, a user input of feedback that identifies a feature of the navigation error entered via the feedback interface; and determining a map correction for a map database based on the user input of feedback.

12. The method of claim 11, wherein the intra-route navigation error package is generated in response to a user input to the user computer device.

13. The method of claim 11, wherein the route context presented to the user via the feedback interface includes a map indicating the geospatial location of the user when the user input was entered, wherein the feedback interface includes an annotation tool for the user to annotate the map with feedback.

14. The method of claim 11, wherein the plurality of sensor devices include a camera device configured to capture the image data of a surrounding environment at a time that the navigation error occurred, and wherein the route context presented to the user via the feedback interface includes at least a portion of the image data of the surrounding environment at the geospatial location.

15. The method of claim 14, wherein the feedback interface includes an annotation tool for annotating on the portion of the image data of the surrounding environment at the geospatial location presented via the feedback interface, wherein the annotation tool generates an annotated imagery input for an annotation based on a user input, the annotated imagery input being associated with the portion of the image data and sent to the server system as the user input of feedback.

16. The method of claim 11, further comprising, at the server system:

determining a suggested navigation error based on the plurality of route context data from the intra-route navigation error package; and presenting the suggested navigation error to the user via the feedback interface.

17. The method of claim 16, further comprising, at the server system:

determining one or more other intra-route navigation error packages received from other users indicating that a navigation error occurred proximate to the geospatial location; and determining the suggested navigation error based on route context data of the one or more other intra-route navigation error packages.

18. The method of claim 11, wherein the plurality of sensor devices includes a microphone sensor device configured to capture the sound data at a time that the navigation error occurred, and wherein the route context presented to the user via the feedback interface includes a playback of at least a portion of the sound data.

19. The method of claim 11, wherein the plurality of sensor devices includes a weather sensor device that includes at least one a temperature sensor, a wind sensor, a humidity sensor, and a rain sensor, wherein the weather sensor device being configured to capture the weather data of a nearby environment at a time that the navigation error occurred, and wherein the route context presented to the user via the feedback interface includes at least a portion of the weather data.

20. A computer system comprising:

an input device;

a plurality of sensor devices;

a display; and a processor configured to:

detect, at an initial point in time as a user travels along a route, an intra-route user input via the input device indicating that a navigation error has occurred;

in response to detecting the intra-route user input, determine a current geospatial location of the computer system via a positioning sensor device of the plurality of sensor devices and capture a plurality of route context data via the plurality of sensor devices, wherein at least a portion of the route context data includes user biometric data, image data, sound data, or weather data captured by at least another sensor device of the plurality of sensor devices;

determine a later point in time upon completion of travel along the route when the user of the computer system is not traveling;

present, via the display at the later point in time, a feedback interface that includes a route context determined based on the plurality of route context data, wherein the route context includes at least the portion of the route context data that includes the user biometric data, the image data, the sound data, or the weather data to be presented to the user via the feedback interface;

receive a user input of feedback that identifies a feature of the navigation error via the feedback interface; and send the user input of feedback to a server system.

* * * * *